(12) United States Patent
Ziech et al.

(10) Patent No.: US 7,377,530 B2
(45) Date of Patent: May 27, 2008

(54) TAPERED SLEEVE SUSPENSION ARM JOINT

(75) Inventors: James Ziech, Kalamazoo, MI (US); Michael Chamberlin, Richland, MI (US)

(73) Assignee: Dana Heavy Vehicle Systems Group, LLC, Toledo, OH (US)

( * ) Notice: Subject to any disclaimer, the term of this patent is extended or adjusted under 35 U.S.C. 154(b) by 576 days.

(21) Appl. No.: 10/660,239

(22) Filed: Sep. 11, 2003

(65) Prior Publication Data

US 2005/0057013 A1    Mar. 17, 2005

(51) Int. Cl.
   *B60G 1/04*    (2006.01)
(52) U.S. Cl. .................................. 280/124.11
(58) Field of Classification Search ........... 280/124.11, 280/124.157, 124.116; 384/271, 272, 267; 403/358, 367, 368, 369, 371, 374.1
   See application file for complete search history.

(56) References Cited

U.S. PATENT DOCUMENTS

| 718,376 | A | * | 1/1903 | O'Reilly ..................... 384/540 |
| 1,382,606 | A | | 6/1921 | Norton |
| 1,811,679 | A | | 6/1931 | Volet |
| 2,853,325 | A | * | 9/1958 | Ward .......................... 280/682 |
| 3,009,747 | A | * | 11/1961 | Pitzer ......................... 384/272 |
| 3,547,215 | A | | 12/1970 | Bird |
| 3,917,425 | A | | 11/1975 | Allaben, Jr. |
| 4,563,106 | A | | 1/1986 | Stiiwe |
| 5,005,913 | A | * | 4/1991 | Kittle et al. ................. 301/128 |
| 5,011,306 | A | * | 4/1991 | Martinie ..................... 384/585 |
| 5,251,986 | A | * | 10/1993 | Arena ......................... 384/272 |
| 5,366,237 | A | | 11/1994 | Dilling et al. |
| 5,572,909 | A | | 11/1996 | Chi |
| 5,980,116 | A | | 11/1999 | Chiang |
| 6,491,314 | B2 | * | 12/2002 | Smith et al. .......... 280/124.116 |
| 2001/0017451 | A1 | | 8/2001 | Smith et al. |
| 2003/0146592 | A1 | | 8/2003 | Chalin et al. |
| 2003/0150664 | A1 | | 8/2003 | Woods et al. |
| 2005/0051986 | A1 | * | 3/2005 | Galazin et al. ....... 280/124.116 |

FOREIGN PATENT DOCUMENTS

GB      1 229 999 A    4/1971
WO      WO 97/06022    2/1997

OTHER PUBLICATIONS

Neway Anchorlok Int., Inc. "Neweld", Product Brochure Form 2058 0399 7M (2 pages), 1999.
International Search Report dated Nov. 22, 2004 in International App. No. PCT/US2004/028845.
Written Opinion dated Nov. 22, 2004 in International App. No. PCT/US2004/028845.

* cited by examiner

*Primary Examiner*—Faye M. Fleming
(74) *Attorney, Agent, or Firm*—Dykema Gossett PLLC

(57) ABSTRACT

A suspension is provided that eliminates welded connections between the suspension control arm and the axle. The suspension includes a control arm coupled to a vehicle frame. The control arm has a first sleeve, through which an axle is received. The first sleeve of the control arm has a radially inner surface that tapers. The suspension further includes a second sleeve configured to be received within the first sleeve, about the axle. The second sleeve has a radially outer surface that tapers complementary to the radially surface of the first sleeve. As the second sleeve is urged inward within the first sleeve, the second sleeve clamps down upon the axle.

16 Claims, 4 Drawing Sheets

TAPERED SLEEVE SUSPENSION ARM JOINT

BACKGROUND OF THE INVENTION

1. Field of the Invention

The present invention relates to a vehicle suspension, and more particularly, to the connection between a suspension control arm and an axle.

2. Discussion of Related Art

A conventional vehicle includes a vehicle frame having a pair of longitudinally extending frame rails that support the vehicle engine and body. The frame is supported on a plurality of ground-engaging wheels that are disposed at opposite ends of a plurality of axles. The vehicle may contain, for example, a steer axle on which the wheels are steerable by the vehicle operator, a drive axle whose wheels are driven by the vehicle engine, and one or more non-driven trailer axles. Each of the axles are coupled to the vehicle frame through a suspension that dampens movements transmitted between the wheels and the vehicle frame.

A conventional suspension includes a forward or trailing arm by which an axle is mounted onto the vehicle frame. One end of the arm has a sleeve through which the axle is inserted. The axle is secured against movement relative to the arm by one or more welds. This conventional suspension, however, suffers from several drawbacks. In particular, the connection between the arm and the axle is a highly loaded joint. As such, the welds used to attach the axle to the arm are subject to fatigue failures. Several attempts have been made to eliminate the welded connection between the axle and arm including the use of U-bolts or clamps to couple the axle and arm. None of these suspensions, however, uniformly clamps the entire outer surface of an axial cross-section of the axle.

The inventors herein have recognized a need for a vehicle suspension that will minimize and/or eliminate one or more of the above-identified deficiencies.

SUMMARY OF THE INVENTION

The present invention provides a suspension with a tapered sleeve arm joint for coupling an axle to the vehicle frame.

A suspension in accordance with one embodiment of the present invention includes a control arm configured for connection to a frame of a vehicle and configured to receive an axle. The control arm defines a first sleeve disposed about an axis through which the axle extends. The first sleeve has a radially inner surface that tapers. The suspension further includes a second sleeve configured to be received within the first sleeve of the control arm and about the axis. The second sleeve has a radially-outer surface that tapers complementary to the radially-inner surface of the first sleeve.

A suspension in accordance with the present invention is advantageous. The clamping action of the tapered first sleeve of the control arm and the tapered second sleeve eliminates the need to weld the axle to the control arm. It is desirable to eliminate this weld because the connection of the arm to the axle is subject to high mechanical and environmental stresses that tend to cause fatigue failures. In addition, the sleeves uniformly clamp the entire outer surface of the axle at an axial cross-section of the axle. This uniform clamping action is desirable because it allows for the even distribution of mechanical stresses and loads throughout the joint.

These and other features and objects of this invention will become apparent to one skilled in the art from the following detailed description and the accompanying drawings illustrating features of this invention by way of example.

DETAILED DESCRIPTION OF EMBODIMENTS OF THE INVENTION

Figure 1:
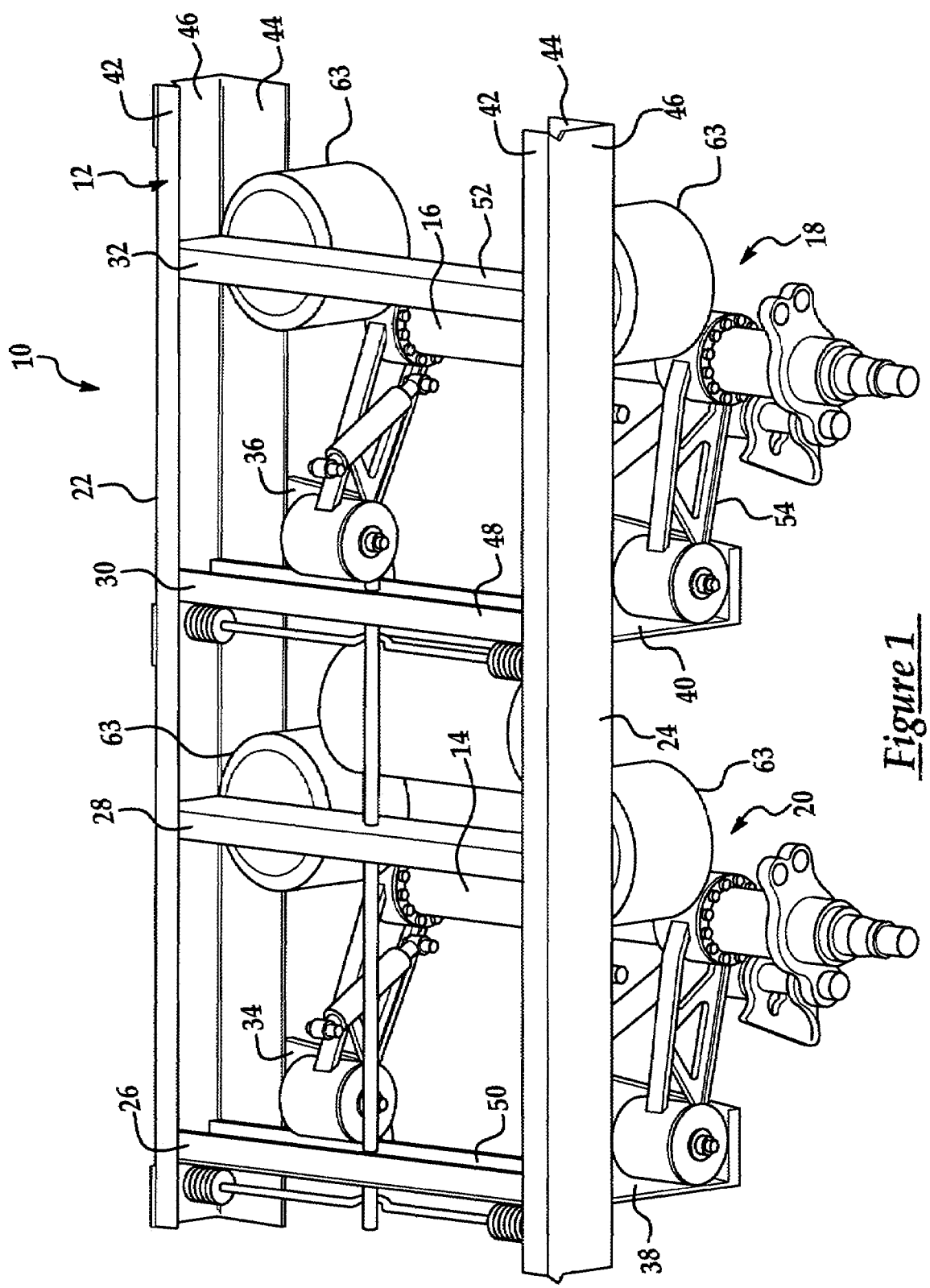
FIG. 1 is perspective view of a portion of a vehicle incorporating a suspension in accordance with one embodiment of the present invention.

Referring now to the drawings wherein like reference numerals are used to identify identical components in the various views, FIG. 1 illustrates a perspective view of a portion of a vehicle 10 including a frame 12 and axles 14, 16. Vehicle 10 further includes a pair of suspensions 18, 20 in accordance with one embodiment of the invention.

Frame 12 is provided to support various components of the vehicle and is conventional in the art. In the illustrated embodiment, frame 12 comprises a trailer frame for use with heavy trucks. It should be understood, however, that the present invention may find use with a variety of vehicle frames and in a variety of vehicles. Frame 12 may include side rail members 22, 24, cross members 26, 28, 30, 32, and a plurality of mounting brackets such as brackets 34, 36, 38, 40.

Rail members 22, 24 extend in the longitudinal direction of the vehicle generally parallel to one another. Rail members 22, 24 are generally C-shaped in cross-section and open towards one another in a conventional manner. Each rail member 22, 24 includes top and bottom walls, 42, 44 and a side wall 46, respectively. Walls 42, 44 may extend transverse to the longitudinal direction of the vehicle (and substantially horizontally relative to earth ground) in an inboard direction while wall 46 extends perpendicular (and substantially vertically relative to earth ground) relative to walls 42, 44.

Cross-members 26, 28, 30, 32 connect rail members 22, 24. Members 26, 28, 30, 32 extend transversely relative to rail members 22, 24. Members 26, 28, 30, 32 may also be generally C-shaped in cross-section, with members 26, 28 and 30, 32 opening towards one another, respectively. Each of cross-members 26, 28, 30, 32 may include top and bottom walls 48, 50 and side wall 52. Walls 48, 50 extend forward or rearward relative to the direction of vehicle travel (and substantially horizontally relative to earth ground) while wall 52 extends perpendicular to walls 48, 50 (and generally vertically relative to earth ground). Each member 26, 28, 30, 32 may include first and second ends configured to be received between top and bottom walls 42, 44 and against side wall 46 of rail members 22, 24 respectively. Members 26, 28, 30, 32 may be welded to members 22, 24.

Axles 14, 16 support frame 12 on ground engaging wheels (not shown) disposed at either end of each axles 14, 16. Axles 14, 16 are conventional in the art and comprise non-driven trailer axles in the illustrated embodiment. Axles 14, 16 extend transverse to the longitudinal direction of vehicle 10 and frame 12.

Figure 2:
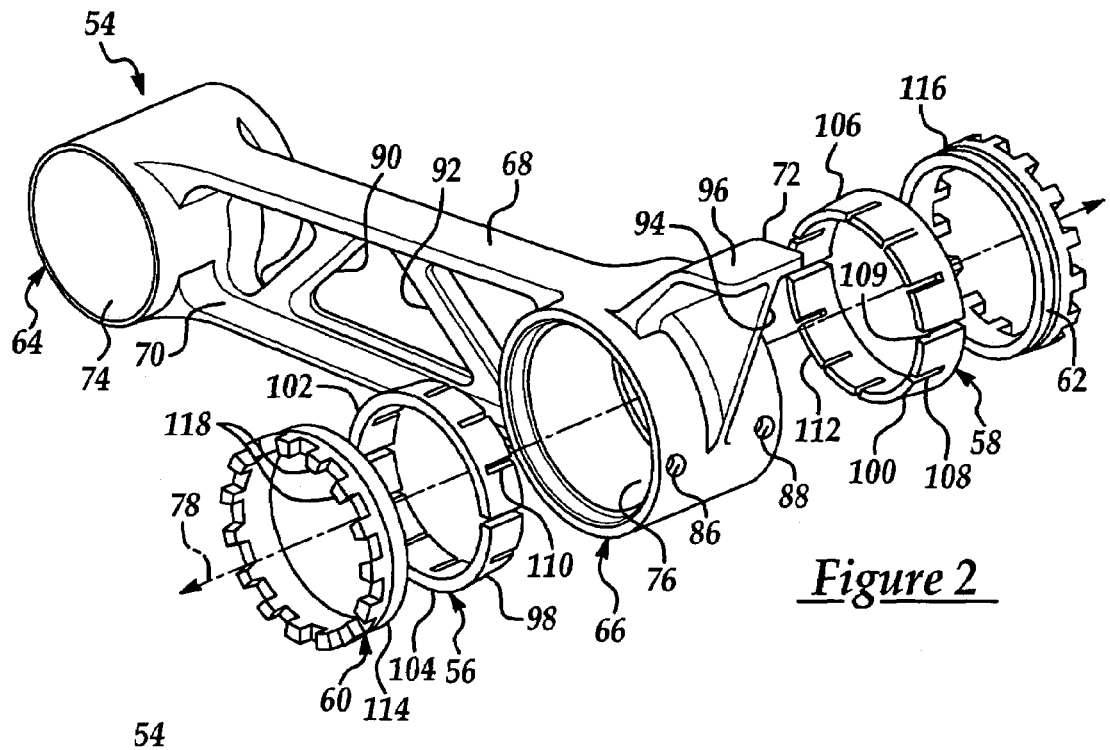
FIG. 2 is an exploded view of a suspension in accordance with one embodiment of the present invention.

Suspensions 18, 20 are provided to dampen movements between axles 14, 16 and frame 12. Referring now to FIG. 2, each suspension 18, 20 may include a pair of suspension control arms 54 disposed proximate opposite ends of a corresponding axle 14, 16, and corresponding sleeves 56, 58 and 60, 62 for each arm. Referring again to FIG. 1, each suspension 18, 20 may also include springs 63 supported on arms 54.

Referring again to FIG. 2, arm 54 comprises a trailing arm in the illustrated embodiment. It should be understood, however, that arm 54 may be oriented as a forward arm in an alternative embodiment. Arm 54 includes sleeves 64, 66 disposed at either longitudinal end, support members 68, 70, coupling sleeves 64, 66, and a spring mounting bracket 72.

Sleeve 64 is disposed at the forward end of arm 54 and defines a cylindrical bore 74. Sleeve 64 is sized to be received within a corresponding bracket, such as bracket 34, of frame 12 and bore 74 is sized to receive a bushing (not shown) in a conventional manner to couple arm 54 to frame 12 and allow rotation of arm 54 relative to frame 12.

Figure 3:
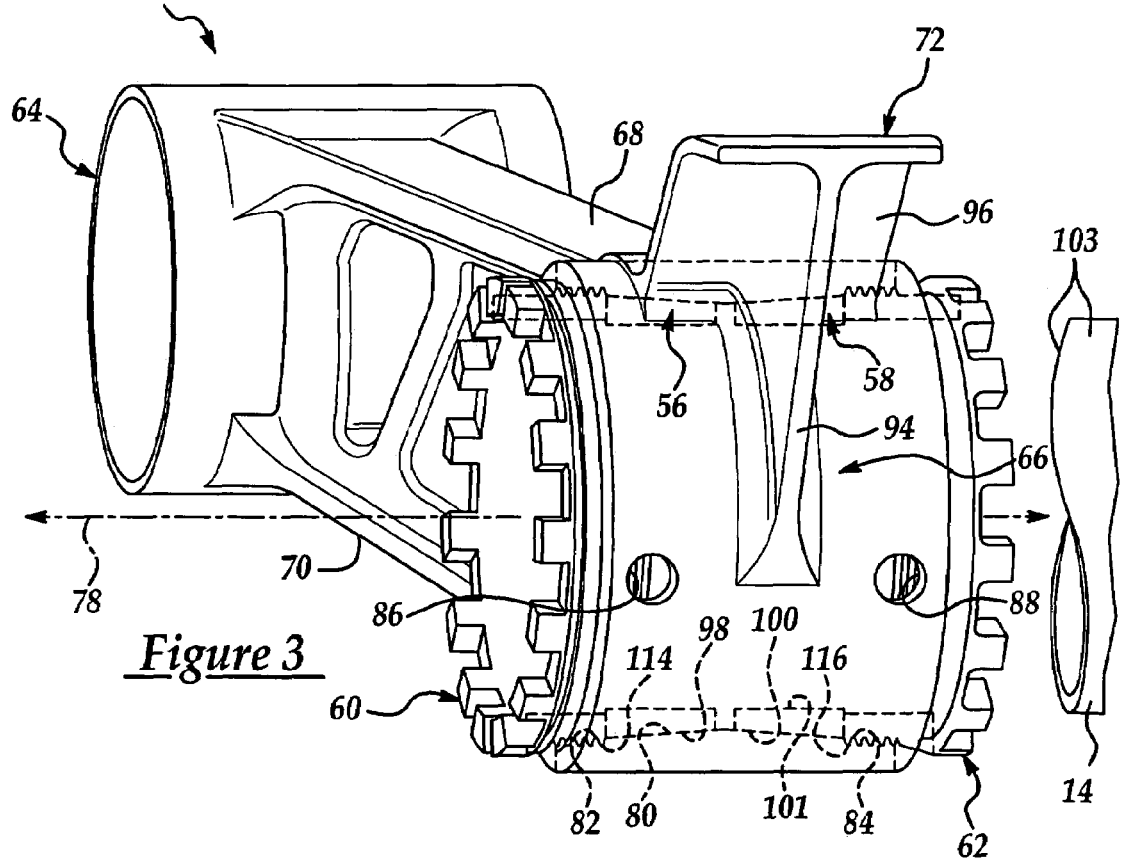
FIG. 3 is a perspective and partial sectional view of the suspension of FIG. 2.

Sleeve 66 is disposed at a rearward end of arm 54 and also defines a cylindrical bore 76. Bore 76 is disposed and centered about an axis 78 that extends longitudinally through a corresponding axle, such as axle 14. Referring now to FIG. 3, sleeve 66 has a radially inner surface 80 that tapers. In particular, surface 80 tapers inwardly away from each axial end of sleeve 66 and toward an axial midpoint of sleeve 66. In the illustrated embodiment, surface 80 tapers inwardly away from each axial end of sleeve 66 beginning at points distant from the axial ends of sleeve 66. In a preferred embodiment, the entire circumference defined by surface 80 tapers. It should be understood, however, that in an alternative embodiment only angularly spaced portions of surface 80 could be made to taper. Surface 80 may also define pluralities of threads 82, 84 proximate either axial end of sleeve 66 for a purpose described in greater detail below. Finally, sleeve 66 may define one or more additional bores 86, 88 that extend radially and are in communication with bore 76 for a purpose also described below.

Referring again to FIG. 2, support members 68, 70 extend in the longitudinal direction of the vehicle and couple sleeves 64, 66. Support members 68, 70 and sleeves 64, 66 may be integral and form a single piece or unitary part. Alternatively, support members 68, 70 may be welded or otherwise coupled to sleeves 64, 66 in a conventional manner. Support member 68 is disposed vertically above support member 70 and couples sleeves 64, 66 at a circumferential location on sleeves 64, 66 proximate their uppermost extent. Support member 70 couples sleeves 64, 66 at a circumferential location on sleeves 64, 66 proximate their lowermost extent. Members 68, 70 are coupled to each other by cross members 90, 92 that extend forwardly and rearwardly from member 68 to member 70 to form a substantially triangular configuration.

Bracket 72 provides a spring seat for a corresponding spring 63. Bracket 72 includes a first wall 94 disposed about a portion of the circumference of sleeve 66 and extending upward and rearwardly from sleeve 66. Bracket 72 further includes a second wall 96 that is generally S-shaped in cross-section. Wall 96 is coupled to the forward and upper edges of wall 94. Bracket 72 may be integral with sleeve 66 such that arm 54 is unitary in construction.

Figure 8:
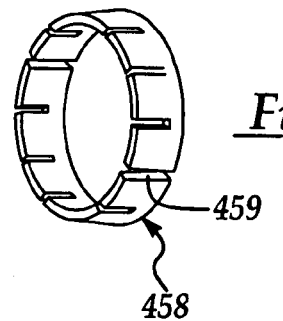
FIG. 8 is a perspective view of a portion of a suspension in accordance with another embodiment of the present invention.

Sleeves 56, 58 are provided to clamp an axle, such as axle 14, within sleeve 66 in arm 54. Sleeves 56, 58 are configured to be received within sleeve 66 of arm 54 and may be disposed and centered about axis 78. Sleeves 56, 58 each define a radially outer surface 98, 100, respectively, that tapers in a manner complementary to surface 80 of sleeve 66. In particular, surfaces 98, 100 taper inwardly away from one axial end of a sleeve 66 and toward an axial midpoint of sleeve 66. In a preferred embodiment, the entire circumference defined by surfaces 98, 100 taper. It should again be understood, however, that in an alternative embodiment only angularly spaced portions of surfaces 98, 100 could be made to taper. Sleeves 56, 58 have an inside diameter 101 substantially equal to an outside diameter 103 of axle 14. Sleeves 56, 58 are inserted through opposite axial ends of sleeve 66. In one embodiment of the invention, each of sleeves 56, 58 may include a pair of circumferentially spaced portions 102, 104 and 106, 108 respectively, separated by two arcuate slots or gaps 109 that extend from one axial end of each sleeve 56, 58 to an opposite axial end of sleeve 56, 58. Referring to FIG. 8, in an alternate embodiment, each sleeve (only one of which, sleeve 458, is illustrated) may be unitary in construction (i.e., one piece) and have a single arcuate gap or slot 459 separating opposed circumferential ends of each sleeve (the sleeves otherwise being similar to sleeves 56, 58). Slots 109, 459 are provided to enable easier assembly of sleeves 56, 58 and 458, respectively, about axle 14, but are not required. In the illustrated embodiment, each of portions 102, 104, 106 and 108 may further include one or more axially extending and angularly spaced slits 110. Each slit may begin at one axial end of sleeve 56, 58 and terminate prior to a second axial end of sleeve 56, 58 respectively. As sleeves 56, 58 are inserted into sleeve 66, slits 110 enable tabs 112, defined between a pair of slits 100, to deflect more easily thereby further facilitating assembly.

Sleeves 60, 62 are provided to urge sleeves 56, 58 inward within sleeve 66 to control the position of sleeves 56, 58 within sleeve 66, and to retain sleeves 56, 58 in position within sleeve 66. Sleeves 56, 58 are configured to be received within bore 76 of sleeve 66 and are disposed and centered about axis 78. Sleeves 60, 62 are inserted through opposite axial ends of sleeve. 66. Each of sleeves 60, 62 may include a plurality of threads 114, 116, respectively, configured to engage corresponding threads, 82, 84 in sleeve 66. Each of sleeves 60, 62 may also include a plurality of circumferentially spaced and axially extending lugs 118 that may be gripped by hand or by a tool to rotate sleeves 60, 62 within sleeve 66. Referring to FIG. 3, fasteners (not shown) may be inserted through bores 86, 88 in sleeve 66 to couple sleeves 60, 62 to sleeve 66. In one embodiment, the fasteners comprise welds. It should be understood, however, that other conventional fasteners may also be used.

Referring to FIGS. 2 and 3, a method for coupling a suspension 18 to an axle 14 will be described in greater detail. The method may begin with the step of providing a suspension control arm 54 that is configured to connection to a frame 12 of a vehicle 10 and is also configured to receive an axle 14. As described above, arm 54 may define a sleeve 66 that is disposed about an axis 78 through which axle 14 extends and that has a radially inner surface 80 that tapers. The method may continue with the step of inserting axle 14 through sleeve 66, whether by movement of arm 54 or axle 14. The method may further include the step of inserting sleeve 56 over axle 14 into sleeve 66. As discussed above, sleeve 56 may be configured to be received with sleeve 66 of arm 54 and about axis 78, and has a radially outer surface 98 that tapers complementary to surface 80 of sleeve 66. The step may include the substep of locating portions 102, 104 of sleeve 56 over angular portions of axle 14 and sliding portions 102, 104 inward within sleeve 66. The method may further include the step of inserting a sleeve 60 over axle 14 into sleeve 66. As set forth above, sleeve 60 may include a plurality of threads 114 configured to engage corresponding threads 82 in sleeve 66. Accordingly, this step may include the substeps of engaging the threads 82, 114 on sleeves 56, 60 and rotating sleeve 60 to a predetermined distance to thereby urge sleeve 56 to a predetermined position within sleeve 66 and clamp axle 14 within sleeve 66. The method may finally include the step of rigidly fastening sleeve 60 to sleeve 66 by inserting a fastener, such as a weld, through bore 86 in sleeve 66. It should be understood that sleeves 58, 62 may be inserted and positioned in a like manner.

Figure 4:
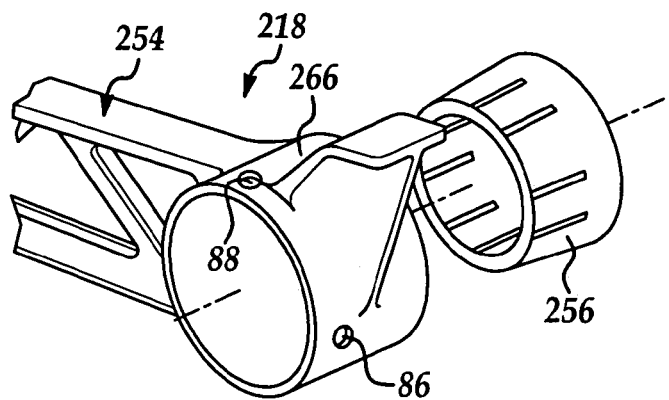
FIG. 4 is an exploded view of a suspension in accordance with another embodiment of the present invention.
Figure 5:
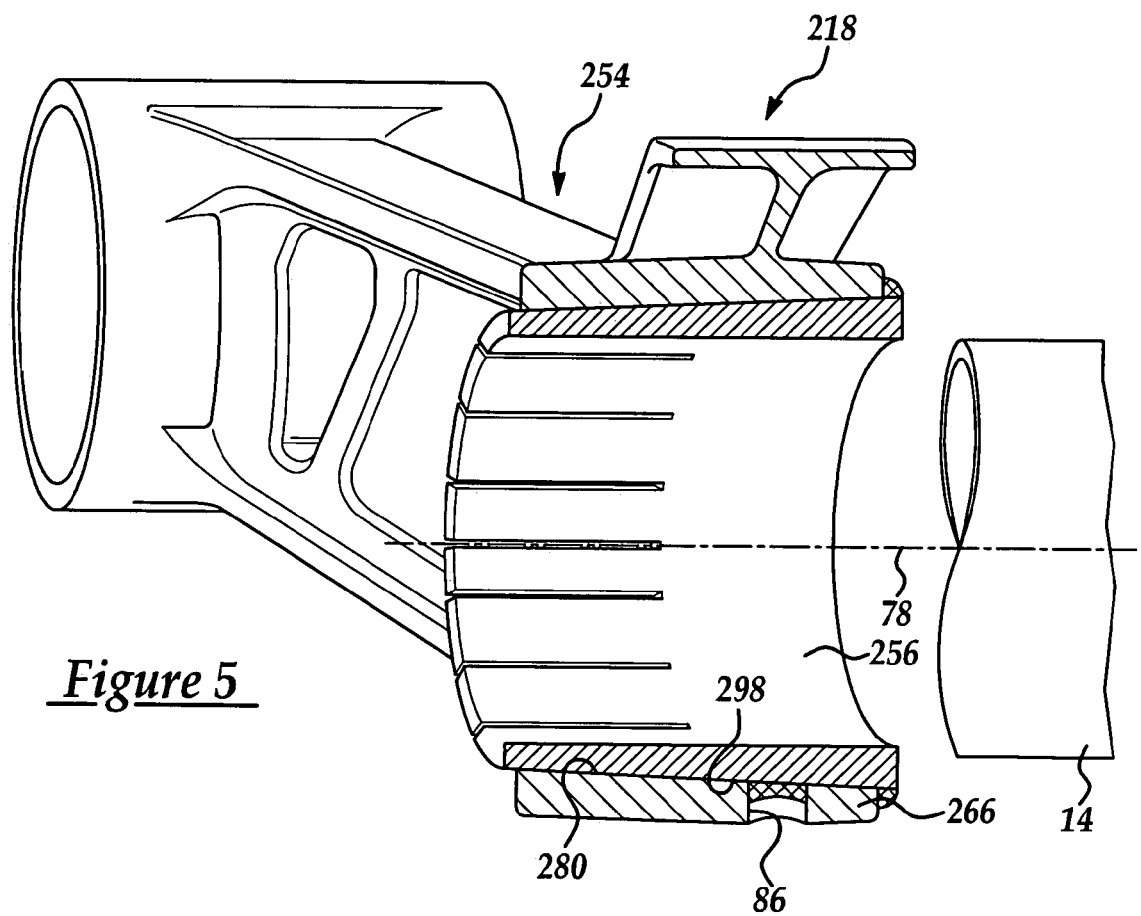
FIG. 5 is a perspective and partial sectional view of the suspension of FIG. 4.

Referring now to FIGS. 4 and 5, a suspension 218 in accordance with another embodiment of the present invention will be described. Suspension 218 is similar to suspension 18 and, therefore, reference may be had to the description of suspension 18 for a description of the structure and functionality of similar components. Suspension 218 is provided to dampen movement between an axle 14 and frame 12. Suspension 218 may include a pair of suspension control arms 254 disposed proximate opposite ends of a corresponding axle 14 and a corresponding sleeve 256 for each arm. Although FIGS. 4 and 5 illustrate only one control arm 254 and sleeve 256, it will be appreciated that suspension 218 may incorporate similar structures proximate either end of axle 14 and that similar suspensions 218 may be used for multiple axles.

Arm 254 is substantially similar to arm 54 described hereinabove, but defines a sleeve 266 at a rearward end that is structurally different from sleeve 66 in arm 54. In particular, and with, reference to FIG. 5, sleeve 266 has a radially inner surface 280 that tapers inwardly from an inboard axial end of sleeve 266 toward an outboard axial end of sleeve 266. In the illustrated embodiment, surface 280 tapers continually from the inboard axial end of sleeve 266 to the outboard axial end of sleeve 266. It should be understood, however, that only a portion of the axial length of sleeve 266 may taper without departing from the spirit of the present invention. Also, in a preferred embodiment, the entire circumference defined by surface 280 tapers. It should be understood, however, that in an alternative embodiment only angularly spaced portions of surface 280 could be made to taper.

Sleeve 256 is provided to clamp an axle, such as axle 14, within sleeve 266 in arm 254. Sleeve 256 is configured to be received within sleeve 266 of arm 254 and may be disposed and centered about axis 78. Sleeve 256 may extend outwardly from either axial end of sleeve 266. Sleeve 256 defines a radially outer surface 298 that tapers in a manner complementary to surface 280 of sleeve 266. In particular, surface 298 tapers inwardly from an inboard axial end of sleeve 256 toward an outboard axial end of sleeve 256. It should be understood that surfaces 280, 298 could alternatively be made to taper inwardly from outboard axial ends of sleeves 266, 256, respectively, to inboard axial ends of sleeves 266, 256. In a preferred embodiment, the entire circumference defined by surface 298 tapers. It should again be understood, however, that in an alternative embodiment only angularly spaced portions of surface 298 could be made to taper. Sleeve 256 is inserted through the inboard axial end of sleeve 266 in the illustrated embodiment. Sleeve 256 is also unitary in construction (i.e., one piece) in the illustrated embodiment and forms an unbroken ring. Alternatively, however, sleeve 256 may include a pair of circumferentially spaced portions separated by multiple arcuate gaps or slots as described hereinabove with respect to sleeve 56 or may include a single arcuate gap or slot as described hereinabove with respect to sleeve 458.

In the embodiment illustrated in FIGS. 4 and 5, sleeve 256 is press fit within sleeve 266 of arm 254 and a threaded sleeve similar to sleeves 60, 62 described hereinabove is not used to position sleeve 256. It should be understood, however, that the embodiment shown in FIGS. 4-5 could be easily modified to accommodate a sleeve similar to sleeves 60, 62. Once sleeve 256 is inserted within sleeve 266 of arm 254, sleeve 256 may be fixedly coupled to sleeve 266 through a weld that encircles a portion or all of the inboard end of sleeve 256 and engages a corresponding portion or all of the inboard edge of sleeve 266. Alternatively, or in addition, sleeve 256 may be fixedly coupled to sleeve 266 by inserting one or more fasteners through bores 86, 88 in sleeve 266 to couple sleeve 256 to sleeve 266. In one embodiment, the fasteners comprise welds. It should be understood, however, that other conventional fasteners may also be used. Sleeve 256 may also have an adhesive on surface 298 to secure sleeve 256 within sleeve 266.

Figure 6:
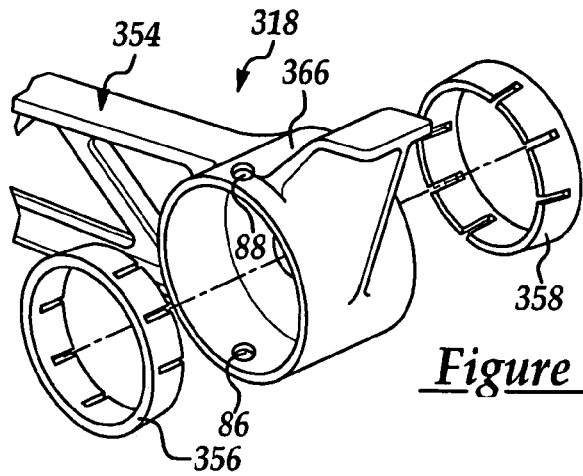
FIG. 6 is an exploded view of a suspension in accordance with another embodiment of the present invention.
Figure 7:
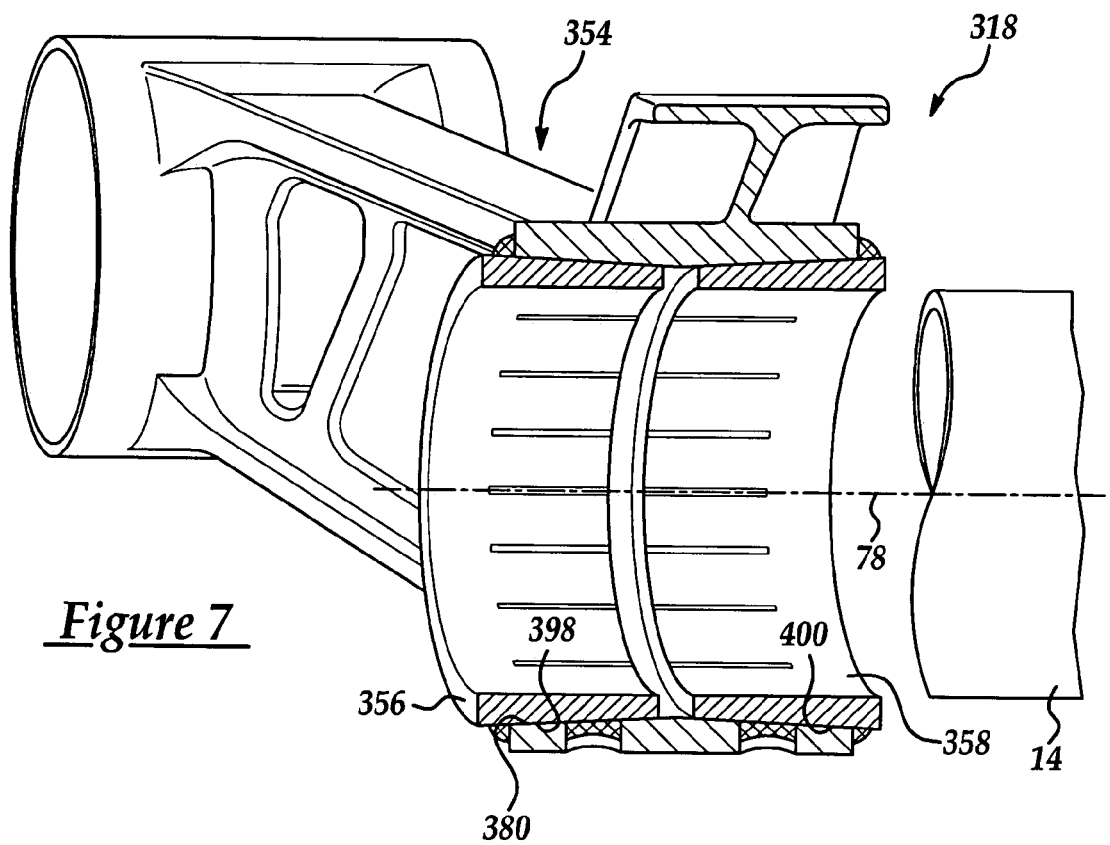
FIG. 7 is a perspective and partial sectional view of the suspension of FIG. 6.

Referring now to FIGS. 6 and 7, a suspension 318 in accordance with another embodiment of the present invention will be described. Suspension 318 is similar to suspension 18 and, therefore, reference may be had to the description of suspension 18 for a description of the structure and functionality of similar components. Suspension 318 is provided to dampen movement between an axle 14 and frame 12. Suspension 318 may include a pair of suspension control arms 354 disposed proximate opposite ends of a corresponding axle 14 and a corresponding sleeves 356, 358 for each arm. Although FIGS. 6 and 7 illustrate only one control arm 354 and set of sleeves 356, 358 it will be appreciated that suspension 318 may incorporate similar structures proximate either end of axle 14 and that similar suspensions 318 may be used for multiple axles.

Arm 354 is substantially similar to arm 54 described hereinabove, but defines a sleeve 366 at a rearward end that is structurally different from sleeve 66 in arm 54. Like sleeve 66, sleeve 366 has a radially inner surface 380 that tapers inwardly from either axial end of sleeve 366 toward an axial midpoint of sleeve 366. Unlike sleeve 66, sleeve 366 may begin tapering inwardly away from each axial end at each axial end (as opposed to points distant from each axial end) and sleeve 366 does not define pluralities of threads proximate either axial end of sleeve 366. In the illustrated embodiment, surface 380 tapers continually from each axial end of sleeve 366 to the axial midpoint of sleeve 366. It should be understood, however, that only a portion of the axial length of sleeve 366 may taper without departing from the spirit of the present invention. Also, in a preferred embodiment, the entire circumference defined by surface 380 tapers. It should be understood, however, that in an alternative embodiment only angularly spaced portions of surface 380 could be made to taper.

Sleeves 356, 358 are provided to clamp an axle, such as axle 14, within sleeve 366 in arm 354. Sleeves 356, 358 are configured to be received within sleeve 366 of arm 354 and may be disposed and centered about axis 78. Sleeves 356, 358 may extend outwardly from either axial end of sleeve 366. Sleeve 356, 358 define radially outer surfaces 398, 400 that tapers in a manner complementary to surface 380 of sleeve 366. In particular, surfaces 398, 400 taper inwardly from one axial ends of sleeve 366 toward an axial midpoint of sleeve 366. In a preferred embodiment, the entire circumference defined by surfaces 398, 400 taper. It should again be understood, however, that in an alternative embodiment only angularly spaced portions of surfaces 398, 400 could be made to taper. Sleeves 356, 358 are inserted through opposite axial ends of sleeve 366. Sleeves 356, 358 are unitary in construction (i.e., one piece) in the illustrated embodiment. Alternatively, however, sleeves 356, 358 may include a pair of circumferentially spaced portions separated by multiple arcuate gaps or slots as described hereinabove with respect to sleeves 56, 58 or may include a single arcuate gap or slot as described hereinabove with respect to sleeve 458.

In the embodiment illustrated in FIGS. 6 and 7, sleeves 356, 358 are press fit within sleeve 366 of arm 354 and a threaded sleeve similar to sleeves 60, 62 described hereinabove is not used to position sleeves 356, 358. Once-sleeves 356, 358 are inserted within sleeve 366 of arm 354, sleeves 356, 358 may be fixedly coupled to sleeve 366 through welds that encircle a portion or all of the inboard ends of sleeves 356, 358 and engage corresponding portions or all of the inboard and outboard edges, respectively, of sleeve 366. Alternatively, or in addition, sleeves 356, 358 may be fixedly coupled to sleeve 366 by inserting one or more fasteners through bores 86, 88 in sleeve 366 to couple sleeves 356, 358 to sleeve 366. In one embodiment, the fasteners comprise welds. It should again be understood, however, that other conventional fasteners may also be used. Sleeves 356, 358 may also have an adhesive located on surfaces 389, 400 to secure sleeves 356, 358 within sleeve 366.

Referring to FIGS. 4-7, a method for coupling a suspension 218 or 318 to an axle 14 will include several steps similar to the above-described method for coupling suspension 18 to axle 14. The method may begin with the step of providing a suspension control arm 254 or 354 that is configured to connection to a frame 12 of a vehicle 10 and is also configured to receive an axle 14. As described above, arms 254, 354 may define sleeves 266, 366 that are disposed about an axis 78 through which axle 14 extends and that have radially inner surfaces 280. 380 that taper. The method may continue with the step of inserting axle 14 through sleeve 266 or sleeve 366, whether by movement of a corresponding arm 254, 354 or axle 14. The method may further include the step of inserting sleeve 256 or sleeve 356 over axle 14 into a sleeve 266 or sleeve 366, respectively. As discussed above, sleeves 256, 356 may be configured to be received with sleeve 266 of arm 254 or sleeve 366 of arm 354, respectively, and about axis 78, and have radially outer surfaces 298, 398, respectively, that taper complementary to surface 280 of sleeve 266 and suface 380 of sleeve 366, respectively. The step may include the substep of locating sleeve 256 or sleeve 356 over axle 14 and sliding sleeve 256 or sleeve 356 inward within sleeve 266 or sleeve 356, respectively using a press fixture. The method may finally include the step of rigidly fastening sleeve 256 to sleeve 266 or sleeve 356 to sleeve 366 by inserting a fastener through one of the radial bores 86, 88 in sleeve 266 or sleeve 366 or by placing a weld around a portion or all of sleeve 256 or sleeve 356 and against the edge of sleeve 266 or sleeve 366, respectively.

A suspension in accordance with the present invention is advantageous compared to conventional suspensions. The inventive suspension eliminates the need for welds, which are subject to fatigue failures, to couple the suspension control arm to the axle. Further, the inventive suspension enables a uniform clamping force around the entire outer surface of a cross-section of the axle.

While the invention has been particularly shown and described with reference to the preferred embodiments thereof, it is well known by those skilled in the art that various changes and modifications can be made in the invention without departing from the spirit and scope of the invention.

We claim:

1. A suspension for a vehicle, comprising:
    a control arm configured for connection to a frame of said vehicle and configured to receive an axle, said control arm defining a first sleeve disposed about an axis through which said axle extends, said first sleeve having a radially inner surface that tapers;
    a second sleeve configured to be received within said first sleeve of said control arm and about said axis, said second sleeve having a radially outer surface that tapers complementary to said radially inner surface of said first sleeve; and
    a third sleeve configured to be received within said first sleeve, said third sleeve abutting against a first axial end of said second sleeve
    wherein said second sleeve includes a pair of circumferentially spaced portions, each of said portions having an angular span of about one hundred and eighty degrees.

2. The suspension of claim 1 wherein said radially inner surface of said first sleeve tapers inwardly away from a first axial end of said first sleeve.

3. The suspension of claim 2 wherein said radially inner surface of said first sleeve tapers inwardly away from each axial end of said first sleeve towards an axial midpoint of said first sleeve.

4. The suspension of claim 1 wherein said third sleeve has a radially outer surface that tapers complementary to said radially inner surface of said first sleeve, said second and third sleeves being inserted through opposite axial ends of said first sleeve.

5. The suspension of claim 1 wherein said second sleeve includes an axially extending slit.

6. A suspension for a vehicle, comprising:
    a control arm configured for connection to a frame of said vehicle and configured to receive an axle, said control arm defining a first sleeve disposed about an axis through which said axle extends, said first sleeve having a radially inner surface that tapers;
    a second sleeve configured to be received within said first sleeve of said control arm and about said axis, said second sleeve having a radially outer surface that tapers complementary to said radially inner surface of said first sleeve; and
    a third sleeve configured to be received within said first sleeve, said third sleeve abutting against a first axial end of said second sleeve
    wherein said radially inner surface of said first sleeve defines a first plurality of threads and said third sleeve defines a second plurality of threads configured to mate with said first plurality of threads.

7. A suspension for a vehicle, comprising:
    a control arm configured for connection to a frame of said vehicle and configured to receive an axle, said control arm defining a first sleeve disposed about an axis through which said axle extends, said first sleeve having a radially inner surface that tapers;

a second sleeve configured to be received within said first sleeve of said control arm and about said axis, said second sleeve having a radially outer surface that tapers complementary to said radially inner surface of said first sleeve; and a third sleeve configured to be received within said first sleeve, said third sleeve abutting against a first axial end of said second sleeve wherein said control arm includes a first bore in communication with a second bore defined by said first sleeve, said first bore configured to receive a fastener coupling said third sleeve to said first sleeve.

8. The suspension of claim 7 wherein said radially inner surface of said first sleeve tapers inwardly away from a first axial end of said first sleeve.

9. The suspension of claim 8 wherein said radially inner surface of said first sleeve tapers inwardly away from each axial end of said first sleeve towards an axial midpoint of said first sleeve.

10. The suspension of claim 7 wherein said third sleeve has a radially outer surface that tapers complementary to said radially inner surface of said first sleeve, said second and third sleeves being inserted through opposite axial ends of said first sleeve.

11. The suspension of claim 7 wherein said second sleeve includes an axially extending slit.

12. The suspension of claim 7 wherein said fastener comprises a weld.

13. A suspension for a vehicle, comprising:
a control arm configured for connection to a frame of said vehicle and configured to receive an axle, said control arm defining a first sleeve disposed about an axis through which said axle extends, said first sleeve having a radially inner surface that tapers inwardly away from each axial end of said first sleeve towards an axial midpoint of said first sleeve;

a second sleeve configured to be received within said first sleeve of said control arm and about said axis, said second sleeve having a radially outer surface that tapers complementary to said radially inner surface of said first sleeve; and a third sleeve configured to be received within said first sleeve of said control arm and about said axis, said third sleeve having a radially outer surface that tapers complementary to said radially inner surface of said first sleeve, said second and third sleeves being inserted through opposite axial ends of said first sleeve wherein said second sleeve includes a pair of circumferentially spaced portions, each of said portions having an angular span of about one hundred and eighty degrees.

14. The suspension of claim 13 wherein said second sleeve includes an axially extending slit.

15. A suspension for a vehicle, comprising:
a control arm configured for connection to a frame of said vehicle and configured to receive an axle, said control arm defining a first sleeve disposed about an axis through which said axle extends, said first sleeve having a radially inner surface that tapers inwardly away from each axial end of said first sleeve towards an axial midpoint of said first sleeve;

a second sleeve configured to be received within said first sleeve of said control arm and about said axis, said second sleeve having a radially outer surface that tapers complementary to said radially inner surface of said first sleeve; and a third sleeve configured to be received within said first sleeve of said control arm and about said axis, said third sleeve having a radially outer surface that tapers complementary to said radially inner surface of said first sleeve, said second and third sleeves being inserted through opposite axial ends of said first sleeve further comprising fourth and fifth sleeves configured to be received within said first sleeve, said fourth and fifth sleeves being inserted through opposite axial ends of said first sleeve, each of said fourth and fifth sleeves abutting against a corresponding one of said second and third sleeves.

16. The suspension of claim 15 wherein said radially inner surface of said first sleeve defines first and second pluralities of threads and said fourth and fifth sleeves define third and fourth pluralities of threads, respectively, configured to engage corresponding ones of said first and second pluralities of threads.

* * * * *